United States Patent Office 3,280,068
Patented Oct. 18, 1966

3,280,068
POLYOXYMETHYLENES CONTAINING
ALLOPHANATES AS STABILIZERS
Ibrahim Dakli, Busto Arsizio, Franco Sabbioni, Castellanza, Enrico Bondi, Legnano, and Nino Oddo, Milan, Italy, assignors to Montecatini Societa Generale per l'Industria Mineraria e Chimica, Milan, Italy
No Drawing. Filed Apr. 30, 1963, Ser. No. 277,004
Claims priority, application Italy, May 4, 1962, 8,963/62
12 Claims. (Cl. 260—45.85)

The present invention relates to compositions of high molecular weight formaldehyde polymers which are stabilized against the action of heat.

It is known that polyoxymethylenes are characterized by a high degree of thermal degradation. Thus, at their melting points or at temperatures in excess of their melting points such polyoxymethylenes are depolymerized to again yield the monomer. The degradation of polyoxymethylene chains takes place by three different mechanisms:

(1) Depolymerization commencing at the terminal OH of the chain, resulting in the elimination of formaldehyde;

(2) Attack of the methylene groups of the polymer by $O_2$ with the formation of peroxidic groups, followed by rupture of the acetal bonds of the chains;

(3) Acid attack of C—O—C bonds of the chain by hydrogen ions. This attack can also be caused by $CH_2O$ which has been freed according to the degradative mechanism (1) and (2) and oxidized, in the presence of air, to formic acid.

In order to improve the thermal stability of polyoxymethylenes so as to permit their practical utilization, it is necessary to stabilize the terminal —OH of the polymeric chains, generally by blocking the terminal groups by means of reactions with less labile chemical groups.

Various techniques are used for this purpose, e.g., esterification, etherification, etc. The polymers thus obtained heretofore, however, have still not exhibited a sufficiently high thermal stability. As a matter of fact, by the action of heat, the polymeric chains may easily be split into small sections with the contemporaneous development of monomeric $CH_2O$ and a significant reduction in the average molecular weights.

The literature has taught the use of various organic substances for the further stabilization of polyoxymethylenes having acetylated or etherified terminal groups.

In general at least two types of additives have been used, each being a specific inhibitor for one of the possible degradative processes of polyoxymethylenes, namely, peroxidization and splitting of the chains through different chemical mechanisms.

Satisfactory results have generally been obtained by using a normal antioxidant (e.g. aromatic amines, phenols, etc.) together with a material capable of blocking other degradation mechanisms. Typical of such materials capable of blocking other demolition mechanisms are polyamides, polyurethanes, urea, etc.

We have surprisingly found that the stability characteristics of the polymer at high temperatures are remarkably improved by mixing intimately such polymer with a compound of the general formula $$NH_2\text{—}CO\text{—}NH\text{—}COOR$$

in which R can be an alkyl, aryl, substituted aryl, bisphenolic or substituted bis-phenolic radical in which the substituents can be —OH, alkyl or alkylene groups. Compounds of this general formula are claimed as new products in Italian patent application No. 22,718, filed April 20, 1962, now Italian Patent 686,043. The process for the preparation of such compounds is also described in this Italian patent.

The present invention provides a thermally stable composition of a high molecular weight solid polymer or copolymer containing —$CH_2O$— units recurring in the polymeric chain, and an amount of from 0.001% to 15% by weight of the polymer, of a stabilizer of the general formula

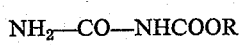

in which R has the aforementioned meaning.

Typical compounds of the above general formula include methyl, ethyl, propyl, isopropyl, butyl, pentyl, 2,2-dimethylpropyl, 2-ethyl-hexyl, octyl, dodecyl and phenyl allophanates.

In the presence of a compound of the foregoing formula and of a small amount of a common antioxidant, the resistance of polymers to thermal degradation is higher than that obtained with a common stabilizer in the same concentration.

The weight losses at 200° C. of polyoxymethylenes stabilized according to the present invention are reported in Table 1.

Among the compounds of the above general formula, these compounds are particularly desirable wherein R is a substituted aryl or a substituted bisphenolic group, such as p-hydroxyphenyl allophanate; dimethyl bis phenol allophanate,

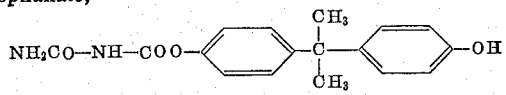

4,4'-butylidene bis (6-tertiary butyl-3-methylphenol) allophanate;
2,2'-methylene bis (4-ethyl-6-tertiary butylphenol) allophanate;
2,2'-methylene bis (4-methyl-6-tertiary butylphenol) allophanate;
2,6-di-tertiary butyl-4-methylphenol allophanate.

Those compounds wherein R is a substituted aryl radical, due to their particular chemical structure, have a most effective protective action on polyoxymethylenes, because they inhibit the degradation mechanisms caused by oxygen and also the degradations caused by the other chain splitting agents.

As will be seen from Table 2 hereinafter, the addition of a normal phenol or amine antioxidant to polymers stabilized with compounds of the foregoing formula does not further improve their thermal stability at high temperatures.

Another advantage offered by the additives of the present invention is that these additives protect the polymers against color changes. Thus the polymer is kept perfectly white, even after prolonged heating in the presence of oxygen. Moreover these new stabilizers are effective even in very low concentrations.

The stabilizing compounds of the present invention can be incorporated in the polymer using any of the conventional techniques suitable for obtaining a uniform dispersion of a powdered solid in a polymer.

The operation can be carried out at room temperature in a powder mixer, or at a temperature higher than the melting point of the polymer in a roll mixer or in a screw-extruder. Another technique involves dissolving the stabilizer in a suitable solvent, impregnating the polymer with the solution thus obtained and then drying the polymer.

According to the present invention, the stabilizing compound is added in an amount not in excess of about 15% by weight of the polymer and not less than about 0.001% by weight. Preferably from about 0.01 to 10% by weight of stabilizer is used.

The polyoxymethylene compositions of this invention may, if desired, also contain other additives such as plasticizers, pigments, etc.

The thermal degradability of the polymers stabilized with the stabilizing compounds of this invention was determined by placing about 0.1 gram of product in a furnace kept at 200° C. in the presence of air, and measuring the weight loss of the sample after 30 minutes.

The results of the tests were expressed by indicating the percent weight loss of the polymer after 30 minutes at 200° C., such percent weight loss being designated by the symbol $K_{200}$.

The viscosity data relates to solutions of the polymer in dimethylformamide at a concentration of 0.5 g./100 cc. and at a temperature of 150° C. in the presence of diphenylamine (1 g./100 cc.).

The results of the determination are expressed as the inherent viscosity defined as follows:

$$\text{inherent viscosity} = \frac{\ln \text{relative viscosity}}{C}$$

in which the relative relative viscosity is the ratio of the viscosity of the solution to the viscosity of the solvent and C is the solute concentration in g./100 cc.

The formaldehyde polymers employed are characterized by a long sequence of —$(CH_2O)$— units and by an inherent viscosity of at least 0.3. They are obtained according to known methods, from aqueous $CH_2O$ solution, or from anhydrous $CH_2O$, or from trioxane.

The stabilized compositions of the present invention are particularly suitable for use in the formation of films, fibers, molded articles and the like, using such techniques as extrusion, injection molding, and the like.

The following examples will further illustrate the invention.

EXAMPLE 1

A polyoxymethylene dihydroxide, prepared by polymerization of anhydrous $CH_2O$ in an anhydrous hydrocarbon solvent at room temperature, while agitating in the absence of air, was acetylated in the presence of acetic anhydride and a hydrocarbon solvent.

To samples of the polyoxymethylene diacetate thus obtained were added the various stabilizers enumerated in Table 1.

The operation was carried out by mixing the two powders in a mill for 30 minutes. The inherent viscosity of the polymer before and after the treatment in the mill was 0.8.

Each sample was then subjected to a thermal treatment at 200° C.

The results obtained are reported in Table 1.

Table 1

Polyoxymethylene diacetate: inherent viscosity 0.8
Percent weight loss ($K_{200}$) at 200° C. after 30 minutes

| | $K_{200}$, percent |
|---|---|
| (1) Polymer (without stabilizer) | 40 |
| (2) Polymer+2% butylallophanate+0.5% DFA [1] | 1.8 |
| (3) Polymer+2% butylallophanate+0.5% BB [2] | 2.0 |
| (4) Polymer+2% phenylallophanate+0.5% DFA | 2.3 |

[1] DFA=diphenylamine.
[2] BB=4,4'-butylidene-bis (6-tertiary butyl-3-methyl-phenol).

EXAMPLE 2

A polyoxymethylene dihydroxide, prepared as described in Example 1, was acetylated in the presence of acetic anhydride.

To samples of the polyoxymethylene diacetate thus obtained were added the stabilizers enumerated in Table 2.

The mixing of the compositions was carried out by means of an agitator. The inherent viscosity of the ploymer was 0.65.

The results of thermal degradation at 200° C. are reported in Table 2.

Table 2

| | $K_{200}$, percent |
|---|---|
| (1) Polymer | 39 |
| (2) Polymer+1% 4,4'-butylidene-bis-(6-tertiarybutyl-3-methyl-phenol) | 2.1 |
| (3) Polymer+1% 4,4'-butylidene-bis-(6-tertiarybutyl-3-methyl-phenol)+0.5% DFA | 2.2 |
| (4) Polymer+1% 4,4'-butylidene-bis-(6-tertiarybutyl-3-methyl-phenol)+0.5% BB | 2.1 |

EXAMPLE 3

A sample of polyoxymethylene dihydroxide was obtained by polymerization of $CH_2O$ in an aqueous solution in the presence of preformed polymer as solid phase. The synthesis conditions described in Italian Patent No. 646,437 were employed and involved contacting at 20° C. an aqueous solution at a pH of 10, containing 10% by weight of $CH_2O$ and 40% of sodium formate, with a polyoxymethylene in a ratio of solid to liquid of about 1:2; continuously feeding a 51% aqueous $CH_2O$ solution and sodium formate so as to maintain constant the concentration of $CH_2O$ and sodium formate in the liquid phase; continuously feeding a concentrated NaOH solution so as to maintain constant with time the pH in the liquid phase; continuously discharging an amount of solid+liquid in the ratios present in the reaction phase, equal to that of the fed substances.

The resultant polyoxymethylene was dried and acetylated as described in Example 2.

The polyoxymethylene diacetate thus obtained was treated with a solution of butylallophanate in ethanol. The amount of solution employed was such as to provide 2% of stabilizer with respect to the weight of the polymer treated.

The alcohol was then evaporated by keeping the sample at 65° C. under vacuum for four hours. Samples of polymer thus treated were mixed with 0.5% DFA and 0.5% BB, respectively. The polymer had an inherent viscosity of 0.69.

The results of thermal degradation at 200° C. are reported in Table 3.

Table 3

| | $K_{200}$, percent |
|---|---|
| (1) Polymer (without stabilizer) | 39 |
| (2) Polymer+2% butyl allophanate+0.5% DFA | 2.0 |
| (3) Polymer+2% butylallophanate+0.5% BB | 3.0 |

EXAMPLE 4

To samples of polyoxymethylene diacetate prepared as described in Example 3 were added the stabilizers enumerated in Table 4.

The mixing was carried out in a powder mixer. The inherent viscosity of the polymer was 0.68.

The results of thermal degradation at 200° C. are reported in Table 4.

Table 4

Polyoxymethylene diacetate: inherent viscosity 0.68
Percent weight loss ($K_{200}$) after 30 minutes at 200° C.

| | $K_{200}$, percent |
|---|---|
| (1) Polymer (without stabilizer) | 42 |
| (2) Polymer+0.5% DFA | 9 |
| (3) Polymer+0.5% BB | 10 |
| (4) Polymer+1% p-hydroxyphenylallophanate | 2 |
| (5) Polymer+1% p-hydroxyphenylallophanate +0.5% DFA | 2 |
| (6) Polymer+1% hydroxyphenylallophanate +0.5% BB | 2 |
| (7) Polymer+2% dimethylbisphenolallophanate | 1.7 |
| (8) Polymer+2% dimethylbisphenolallophanate +0.5% DFA | 1.9 |
| (9) Polymer+2% dimethylbisphenolallophanate +0.5% BB | 1.8 |
| (10) Polymer+2% 2,2'-methylene bis(4-ethyl-6-tertiary butyl phenol)allophanate | 1.9 |
| (11) Polymer+2% 2,2'-methylene bis(4-methyl-6-tertiary butyl phenol)allophanate | 2.0 |

EXAMPLE 5

A modified polyoxymethylene, obtained by copolymerization of formaldehyde with dimethylketene according to the process described in U.S. patent application Serial Number 265,584, filed on March 11, 1963, was mixed with 2% of p-hydroxyphenylallophanate.

The mixing was carried out in a powder mixer.

The inherent viscosity of the polymer before and after the treatment in the mixer was 0.7.

The results of thermal degradation at 200° C. are reported in the following table.

| | $K_{200}$, percent |
|---|---|
| Polymer (without stabilizer) | 90 |
| Polymer+allophanate | 8 |

Variations can of course be made without departing from the spirit of this invention.

Having thus described this invention, what is desired to be secured and claimed by Letters Patent is:

1. A thermally stable composition of (I) a high molecular weight solid polymeric material containing —$CH_2O$— units recurring in the polymeric chain and (II) from about 0.001 to 15%, by weight of said polymeric material, of a stabilizer of the formula $$NH_2-CO-NH-COOR$$

in which R is selected from the group consisting of alkyl, aryl, and substituted aryl radicals in which the substituents are selected from the group consisting of —OH, alkyl and alkylene.

2. The composition of claim 1 wherein said polymeric material is a polyoxymethylene having an inherent viscosity of at least 0.3, as determined in dimethylformamide at 150° C. with a concentration of 0.5% by weight.

3. The composition of claim 2 wherein the polyoxymethylene has the chain ends blocked by groups selected from the group consisting of acyl and ether.

4. The composition of claim 3, said composition also containing from about 0.01 to 5%, by weight of said polyoxymethylene, of an antioxidant selected from the group consisting of diphenylamine and 4,4'-butylidene-bis (6-tertiary butyl-3-methylphenol).

5. The composition of claim 1 wherein said polymeric material is a modified polyoxymethylene obtained by copolymerization of formaldehyde with dimethylketene.

6. The composition of claim 1 wherein the thermal stabilizer is butyl allophanate.

7. The composition of claim 1 wherein the thermal stabilizer is phenyl allophanate.

8. The composition of claim 1 wherein the thermal stabilizer is p-hydroxyphenyl allophanate.

9. The composition of claim 1 wherein the thermal stabilizer is dimethyl-bis-phenolallophanate.

10. The composition of claim 1 wherein the thermal stabilizer is 4,4'-butylidene-bis(6-tertiary butyl-3-methylphenol) allophanate.

11. Films made of the composition of claim 1.

12. Fibers made of the composition of claim 1.

References Cited by the Examiner

UNITED STATES PATENTS

| | | | |
|---|---|---|---|
| 3,144,431 | 8/1964 | Dolce et al. | 260—45.85 |
| 3,155,636 | 11/1964 | Kritzler et al. | 260—67 |
| 3,173,894 | 3/1965 | Hermann et al. | 260—45.85 |

LEON J. BERCOVITZ, *Primary Examiner.*

G. W. RAUCHFUSS, *Assistant Examiner.*